United States Patent
Nozoe (10) Patent No.: US 9,499,227 B2
(45) Date of Patent: Nov. 22, 2016

(54) ADJUSTABLE STEP STRUCTURE FOR SADDLE RIDING TYPE VEHICLE

(71) Applicant: HONDA MOTOR CO., LTD., Minato-ku, Tokyo (JP)

(72) Inventor: Koichi Nozoe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/665,199

(22) Filed: Mar. 23, 2015

(65) Prior Publication Data
US 2015/0274235 A1 Oct. 1, 2015

(30) Foreign Application Priority Data

Mar. 27, 2014 (JP) .................................. 2014-065298

(51) Int. Cl.
*B62J 25/00* (2006.01)
(52) U.S. Cl.
CPC ..................................... *B62J 25/00* (2013.01)
(58) Field of Classification Search
CPC ....................................................... B62J 25/00
See application file for complete search history.

(56) References Cited

U.S. PATENT DOCUMENTS

| | | | |
|---|---|---|---|
| 6,719,316 B1 * | 4/2004 | Anthony | B62J 25/00 280/291 |
| 7,287,773 B1 * | 10/2007 | Stahel | B62J 25/00 280/288.4 |
| 7,431,118 B1 * | 10/2008 | Hogg | B62J 25/00 180/219 |
| 7,997,604 B2 * | 8/2011 | Griep | B62J 25/00 180/90.6 |
| 2003/0122346 A1 * | 7/2003 | Wu | B62K 9/02 280/291 |
| 2005/0012300 A1 * | 1/2005 | Egan | B62J 25/00 280/291 |
| 2005/0116443 A1 * | 6/2005 | Egan | B62J 25/00 280/291 |
| 2013/0015633 A1 * | 1/2013 | Nakabayashi | B62K 25/283 280/281.1 |

FOREIGN PATENT DOCUMENTS

JP 2013-018363 A 1/2013

* cited by examiner

*Primary Examiner* — Joseph Rocca
*Assistant Examiner* — Daniel Yeagley
(74) *Attorney, Agent, or Firm* — Carrier Blackman & Associates, P.C.; Joseph P. Carrier; Jingli Wang (57) ABSTRACT

A step structure for being disposed on left and/or right sides of a saddle riding type vehicle includes a base portion connected to the vehicle and forming at least part of a first footrest, and a movable portion rotatably coupled to the base portion so that the movable portion is movable between first and second operative positions thereof by being rotated relative to the base portion. The movable portion forms a second footrest disposed at a position different from the first footrest when the movable portion is at the second operative position thereof and jointly forms a first footrest with the base portion when at the first operative position thereof.

14 Claims, 7 Drawing Sheets

ADJUSTABLE STEP STRUCTURE FOR SADDLE RIDING TYPE VEHICLE

CROSS-REFERENCE TO RELATED APPLICATIONS

The present invention claims priority under 35 USC 119 based on Japanese patent application No. 2014-065298, filed on Mar. 27, 2014. The entire subject matter of this priority document, including specification claims and drawings thereof, is incorporated by reference herein.

BACKGROUND OF THE INVENTION

1. Field of the Invention

The present invention relates to a step structure for a saddle riding type vehicle, and particularly to such a step structure which may be selectively adjusted between different operative positions thereof to accommodate occupants having different sizes and preferences.

2. Background Art

As disclosed in Japanese Patent Laid-Open No. 2013-018363, for example, a conventional step structure for a saddle riding type vehicle is known which includes a rear step corresponding to a sports mode and a front step corresponding to a cruising mode, with an objective of enabling an occupant's riding posture to be changed greatly according to the preferences of a driver.

The above-described conventional step structure for a saddle riding type vehicle desirably includes the rear step and the front step. However, each of the steps has only a single footrest portion having a given operative position. It is, therefore, not possible to move the single footrest portion to different operative position or to select footrest positions according to the constitution, the length of legs, or the like of an occupant.

SUMMARY OF THE INVENTION

In order to overcome this limitation of the conventional step structure, it is an object of the present invention to provide a step structure for a saddle riding type vehicle which makes it possible for a vehicle occupant to select footrest positions according to the constitution, the length of legs, or other characteristics or preferences of an occupant.

In order to satisfy such object, according to a first aspect of the present invention there is provided a step structure for a saddle riding type vehicle, comprising:

a base portion configured to be connected to a vehicle body, the base portion forming at least part of a first footrest; and a movable portion rotatably coupled to the base portion so that the movable portion is movable between a first operative position thereof and a second operative position thereof by being rotated relative to the base portion, wherein the movable portion forms a second footrest disposed at a position different from the first footrest when the movable portion is at the second operative position thereof.

With the step structure for the saddle riding type vehicle according to the first aspect of the present invention, the first footrest formed by the base portion and the second footrest formed by the movable portion at the different position from the first footrest are obtained. Hence, an occupant of the saddle riding type vehicle can select an appropriate or desired footrest position from the footrest position provided by the first footrest and the footrest position provided by the second footrest. Again, the occupant may prefer one footrest position over the other according to the constitution, the length of the legs, etc. of the occupant.

Moreover, the movable portion is rotatably coupled to the base portion, and can selectively assume the first position and the second position thereof simply by being rotated relative to the base portion. Thus, the footrest position provided by the first footrest and the footrest position provided by the second footrest can be formed by a simple structure.

According to a second aspect of the present invention, the step structure for the saddle riding type vehicle can adopt a constitution wherein the base portion forms part of the first footrest, and when the movable portion is at the first operative position thereof the movable portion forms another part of the first footrest such that the base portion and the movable portion jointly form the first footrest.

With such a constitution, the movable portion at the first position thereof and the base portion jointly form the first footrest portion. Thus, the first position of the movable portion can be utilized as a position for incorporating or combining the movable portion with the base portion, so to speak, while the first footrest is easily increased in size. Therefore, the step structure as a whole can be made compact.

According to a third aspect of the present invention, the step structure for the saddle riding type vehicle can adopt a constitution wherein one surface of the movable portion forms a surface of the first footrest configured to be engaged by the occupant and another, different surface of the movable portion forms a surface of the second footrest configured to be engaged by the occupant.

With such a constitution, coupled with the first aspect of the invention whereby the movable portion is rotatably coupled to the base portion and able to assume the first position and the second position by rotation relative to the base portion, the footrest position provided by the first footrest and the footrest position provided by the second footrest can be formed by a more simple structure.

According to a fourth aspect of the present invention, the step structure for the saddle riding type vehicle can adopt a constitution wherein the movable portion is rotatably coupled to the base portion by a shaft, and the step structure further includes a toggle mechanism provided between the shaft and the base portion, and which provides a secure click fit for the movable member at each of the first and second positions thereof.

With such a constitution, state retentions at the first position and the second position of the movable portion are each improved, and the occupant is given an improved feeling.

According to a fifth aspect of the present invention, the step structure for the saddle riding type vehicle can adopt a constitution wherein the base portion is foldable toward and away from the vehicle body jointly together with the movable portion, and the step structure further includes a lock mechanism provided between the base portion or the movable portion and the vehicle body, and which prevents the base portion from being folded toward the vehicle body when the movable portion is disposed in the second position thereof.

Such a constitution permits the entire step structure to be folded closely adjacent the vehicle body, and can eliminate a fear of the vehicle body being scratched due to the folding of the base portion toward the vehicle body when the movable portion is at the second position thereof.

According to a sixth aspect of the present invention, the step structure for the saddle riding type vehicle can adopt a constitution wherein the toggle mechanism includes a toggle mechanism cam provided to one end portion of the shaft, and the lock mechanism includes a lock mechanism cam provided to another end portion of the shaft.

With such a constitution, the toggle mechanism and the lock mechanism can be efficiently formed by making effective use of both ends of the shaft for configuring the movable portion to be rotatable relative to the base portion.

For a more complete understanding of the present invention, the reader is referred to the following detailed description section, which should be read in conjunction with the accompanying drawings. Throughout the following detailed description and in the drawings, like numbers refer to like parts.

INTENT OF DISCLOSURE

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found. There has been chosen a specific exemplary embodiment of a step structure according to the present invention and specific alternative structures and modifications thereto, the embodiment chosen for the purposes of illustration and description of the structure and method of the invention are shown in the accompanying drawings forming a part of the specification.

BRIEF DESCRIPTION OF THE DRAWINGS

FIGS. 1A and 1B are diagrams showing a motorcycle as an example of a saddle riding type vehicle to which an embodiment of a step structure according to the present invention can be applied, FIG. 1A being a top plan view thereof, and FIG. 1B being a side view thereof.

DETAILED DESCRIPTION OF MODE FOR CARRYING OUT THE INVENTION

An exemplary, non-limiting embodiment of a step structure of a saddle riding type vehicle according to the present invention will hereinafter be described with reference to the drawings. Incidentally, the drawings are to be viewed in the orientation of reference numerals. In the following description, a forward-rearward direction, a left-right direction, and an up-down direction are in accordance with directions as viewed from an operator sitting on the saddle riding type vehicle. In the drawings, a forward direction of the vehicle will be denoted as Fr, a rearward direction of the vehicle will be denoted as Rr, a left side of the vehicle will be denoted as L, a right side of the vehicle will be denoted as R, an upward direction of the vehicle will be denoted as U, and a downward direction of the vehicle will be denoted as D. In each of the drawings, the same parts or corresponding parts are identified by the same reference numerals.

Figure 1A:
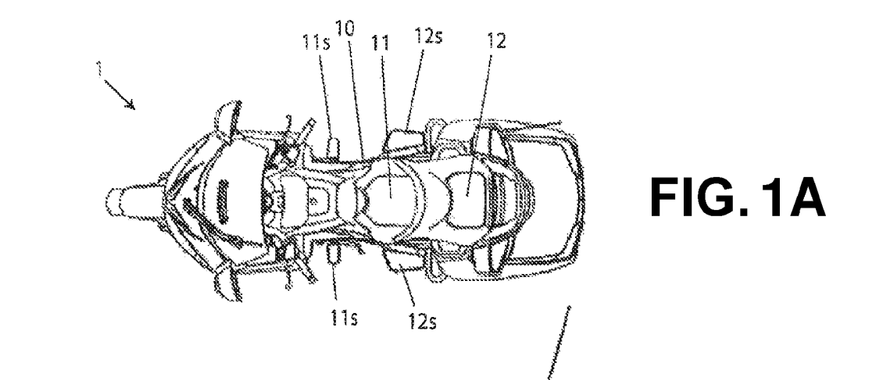
Figure 1B:
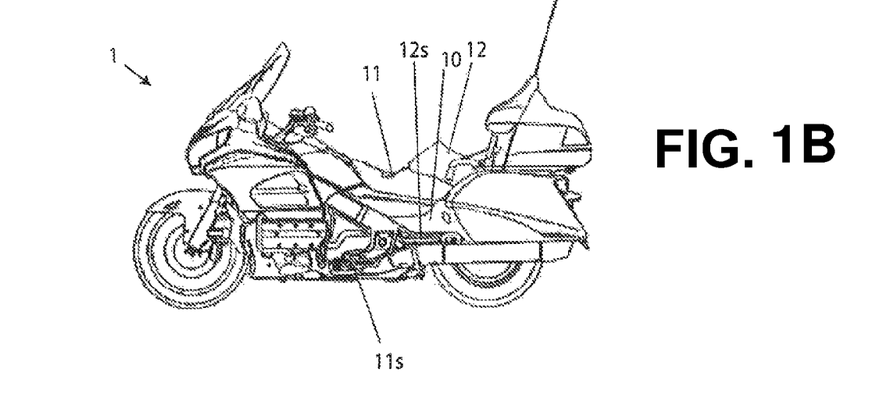

FIGS. 1A, 1B are diagrams respectively showing a top plan view and a side view of a motorcycle as an example of a saddle riding type vehicle to which an embodiment of a step structure according to the present invention can be applied. The motorcycle 1 is designed to be ridden by one or two persons. The motorcycle 1 includes a vehicle body 10, a seat 11 for a driver, steps 11s for the driver, a seat 12 for a passenger, and steps 12s for the passenger, the seats and the steps being attached to the vehicle body 10.

In the present exemplary embodiment, as will be described later, the step structure of the embodiment is applied to the steps 12s for the passenger at right and left sides of the motorcycle. However, depending on a kind of saddle riding type vehicle (for example a saddle riding type four-wheeled vehicle), the step structure according to the present invention may also be applicable as the steps for a driver. In addition, while the step structure according to the present embodiment is applied to the steps 12s provided to the left and right of the saddle riding type vehicle (see FIG. 1A), the following description will be made with the step on the left side as a representative structure.

Figure 2:
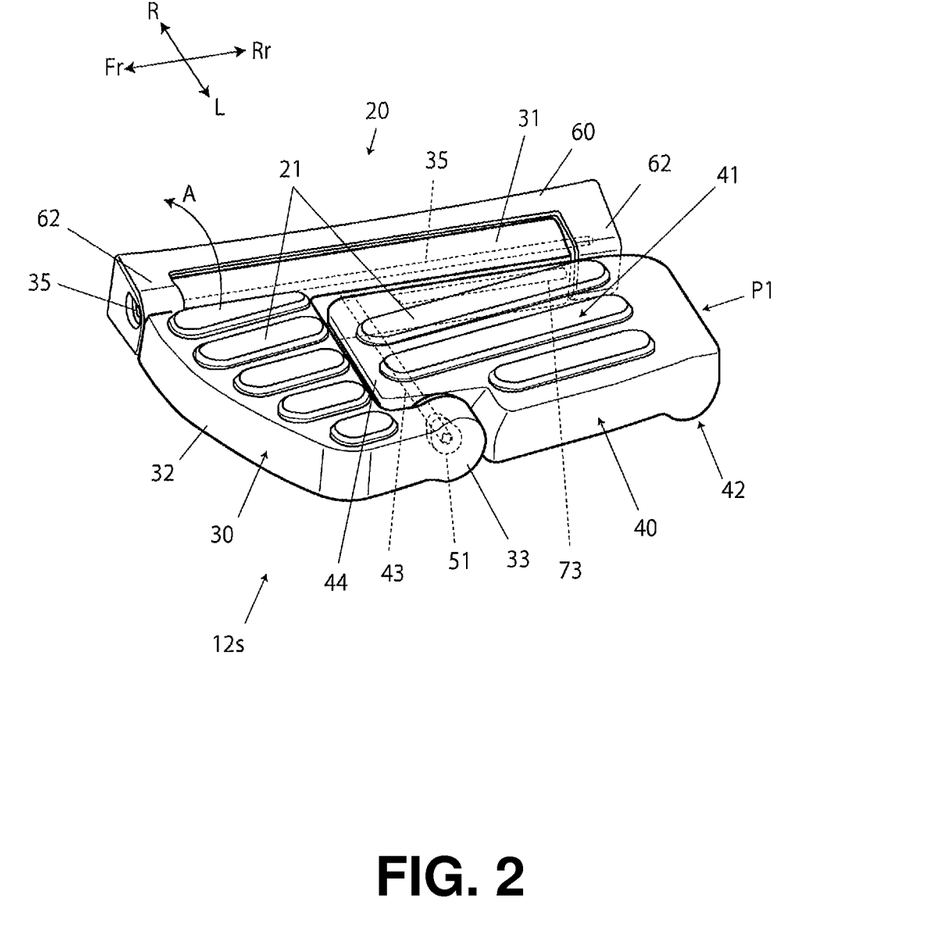
FIG. 2 is a front side perspective view of a step structure according to an exemplary embodiment of the present invention for a saddle riding type vehicle such as shown in FIG.
Figure 3:
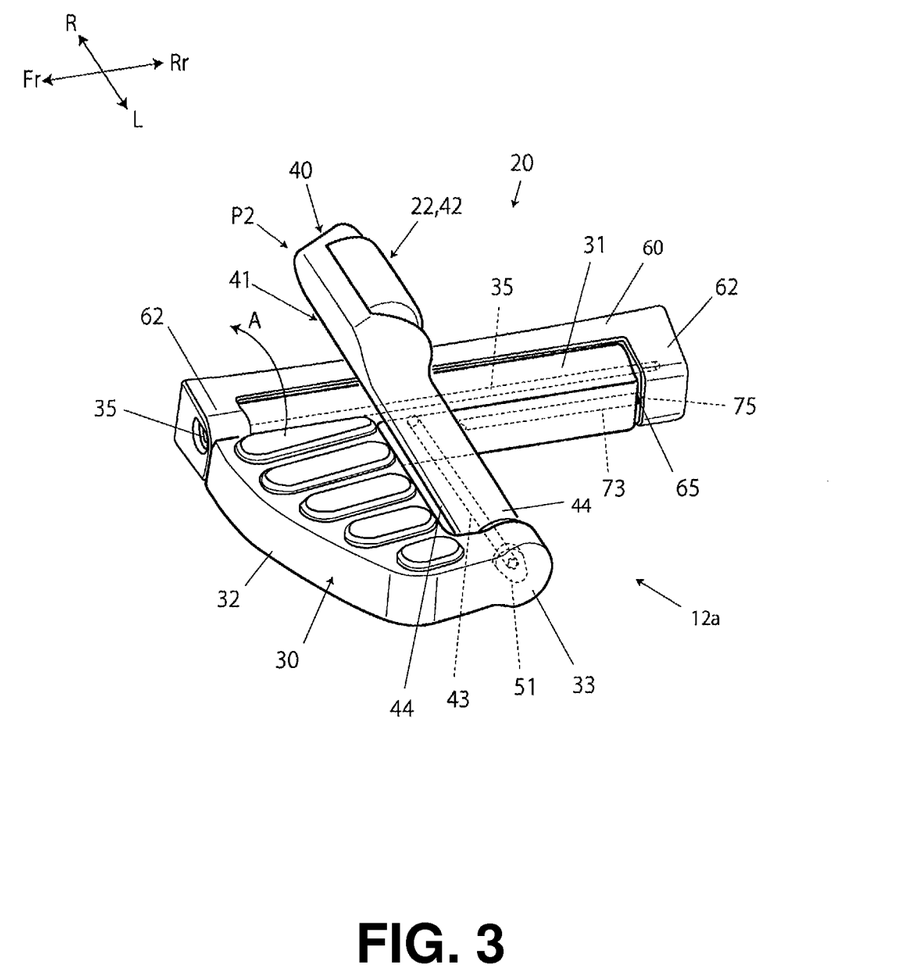
FIG. 3 is another front side perspective view of the step structure of FIG. 2, but wherein the step structure is disposed in a state different from that of FIG. 2.

FIG. 2 and FIG. 3 are each a front side perspective view of the step 12s for the passenger according to the exemplary embodiment of the step structure according to the present invention, although a movable portion 40 of the step structure is disposed in different positions thereof in these views.

The step structure 20 according to the present embodiment includes a base portion 30 supported by the vehicle body 10 and the movable portion 40 rotatably coupled to the base portion 30. The base portion 30 forms part of a first footrest 21, e.g., the base portion 30 shown in the figures forms mainly a front portion of the first footrest 21. The movable portion 40 is rotatably coupled to the base portion 30. By rotation relative to the base portion 30, the movable portion 40 can assume a first position P1 shown in FIG. 2 and a second position P2 shown in FIG. 3. When the movable portion 40 is at the second position P2 shown in FIG. 3, the movable portion 40 forms a second footrest 22 disposed at a different and higher position from the first footrest 21 (FIG. 2).

Incidentally, the present exemplary embodiment has a constitution in which the base portion 30 forms part (mainly a front portion) of the first footrest 21. However, a constitution is also possible in which the base portion 30 forms the whole of the first footrest 21, that is to say, in which the first footrest 21 is formed only by the base portion 30, and the movable portion 40 does not form any part of the first footrest 21.

According to the step structure 20 for the saddle riding type vehicle in the exemplary embodiment, the first footrest 21 (FIG. 2) is formed by the base portion 30 and the movable portion 40 in one, lower position thereof, and the second footrest 22 (FIG. 3) is formed by the movable portion 40 at another, higher position thereof via selective positioning of the movable portion. Hence, the occupant of the saddle riding type vehicle 1 can select, depending on the occupant's desires, a more appropriate footrest position corresponding to either the first footrest 21 and the second footrest 22. The occupant's preference may be based on his/her constitution, the length of his/her legs, etc., or any other reason.

Moreover, the movable portion 40 is rotatably coupled to the base portion 30, and can assume the first position P1 and the second position P2 by simply being rotated relative to the base portion 30. Thus, the footrest position provided by the first footrest 21 and the footrest position provided by the second footrest 22 can be formed by a simple structure.

In the present exemplary embodiment, as described above, the base portion 30 forms part of the first footrest 21, and when the movable portion 40 is at the first position P1, the movable portion 40 also forms part of the first footrest 21 in conjunction with the base portion 30. With such a constitution, as shown in FIG. 2, the movable portion 40 at the first position P1 and the base portion 30 form the first footrest 21. Thus, the first position P1 of the movable portion 40 can be utilized as a position for incorporating or combining the movable portion 40 with the base portion 30, so to speak, while the first footrest 21 is easily increased in size. Therefore, the step structure 20 as a whole can be made compact even though it can be selectively disposed as the first and second footrests which have a relatively large size.

When the movable portion 40 is in its first position as part of the first footrest 21 a surface on one side of the movable portion will be operatively engaged by the occupant's foot when it rests on the first footrest 21 (FIG. 2), and when the movable portion 40 is in its second position as the second footrest 22 another surface on the other side of the movable portion will be operatively engaged by the occupant's foot when it rests on the second footrest 22 (FIG. 3). With such a constitution, coupled with the movable portion 40 being configured to be rotatably coupled to the base portion 30 and able to assume the first position P1 and the second position P2 by rotation relative to the base portion 30, the footrest position (21) provided by the first footrest 21 and the footrest position (22) provided by the second footrest 22 can be formed by a simpler structure.

Figure 4:
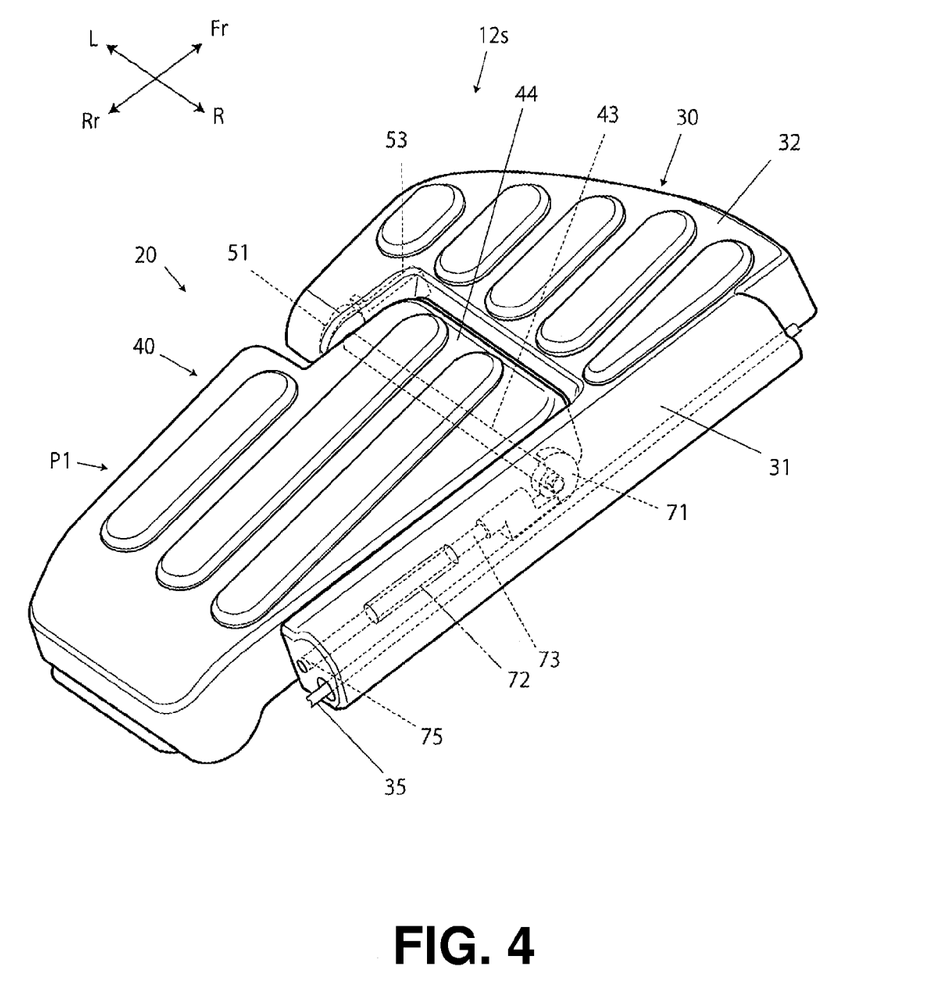
FIG. 4 is a rear side perspective view of the step structure of FIG. 2.
Figure 5:
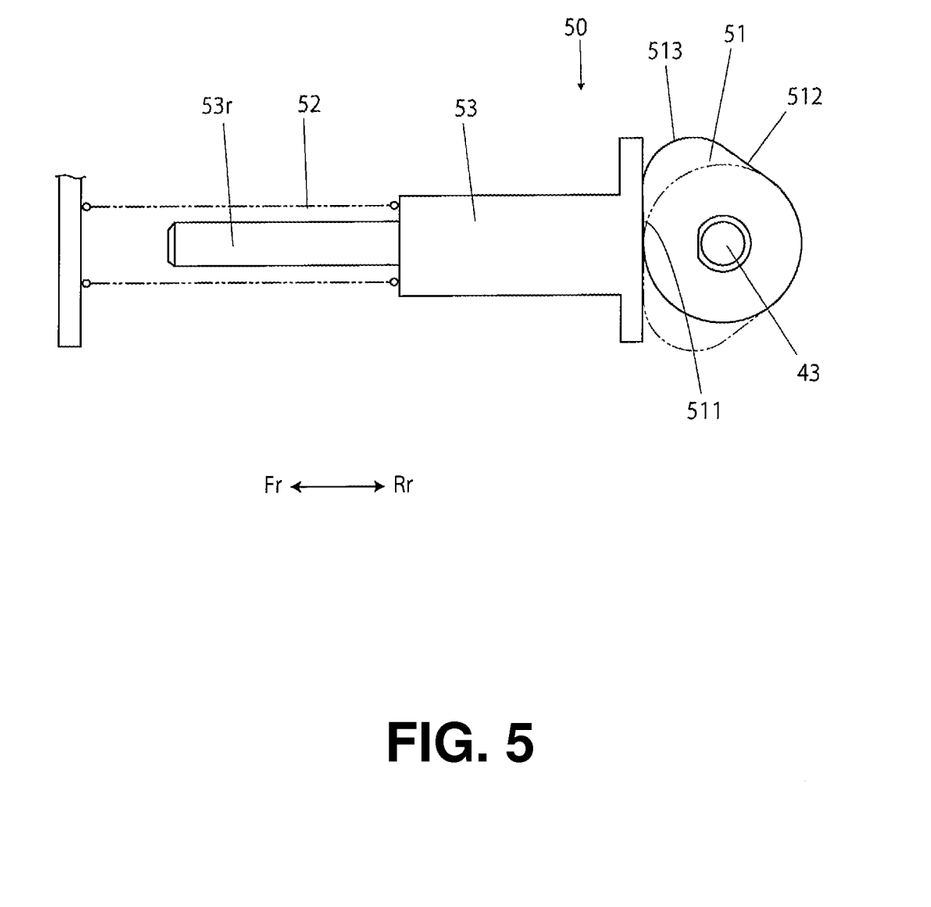
FIG. 5 is a side elevational view of a toggle mechanism of the step structure of FIG. 2.

As shown in FIG. 4, the movable portion 40 is rotatably coupled to the base portion 30 by a shaft 43. As shown in FIG. 5, a toggle mechanism 50 for providing a secure click fit for each of the first position P1 and the second position P2 of the movable portion 40 is provided between the shaft 43 and the base portion 30. With such a constitution, state retentions at the first position P1 and the second position P2 of the movable portion 40 are each improved, and the occupant receives a favorable feeling.

Both ends of the shaft 43 are rotatably supported by the base portion 30. The shaft 43 rotates together with the movable portion 40. As shown in FIG. 5, the toggle mechanism 50 includes: a toggle mechanism cam 51 fixed to one end of the shaft 43; and a cam follower 53 abutting against the toggle mechanism cam 51 in a state of being biased by a spring 52. The cam follower 53 is supported within the base portion 30 so as to be slidable in an axial direction of a rod portion 53r of the cam follower 53. The cam follower 53 is biased to the toggle mechanism cam 51 by the spring 52 mounted around the rod portion 53r.

The toggle mechanism cam 51 includes: a first abutting surface 511 that stably abuts against the cam follower 53 when the movable portion 40 is at the first position P1 shown in FIG. 2; a second abutting surface 512 that stably abuts against the cam follower 53 when the movable portion 40 is at the second position P2 shown in FIG. 3; and a lift face 513 that is situated between the first abutting surface 511 and the second abutting surface 512 and which slides the cam follower 53 against the biasing force of the spring 52 when the movable portion 40 is rotated between the first position P1 and the second position P2.

The base portion 30 can be folded toward the vehicle body 10 (FIG. 1) in a state of being accompanied by the movable portion 40 (see FIG. 2), as indicated by an arrow A in FIG. 2, which is a direction substantially perpendicular to the direction in which the movable portion 40 is rotated when it is moved between the first and second positions P1, P2.

Figure 6:
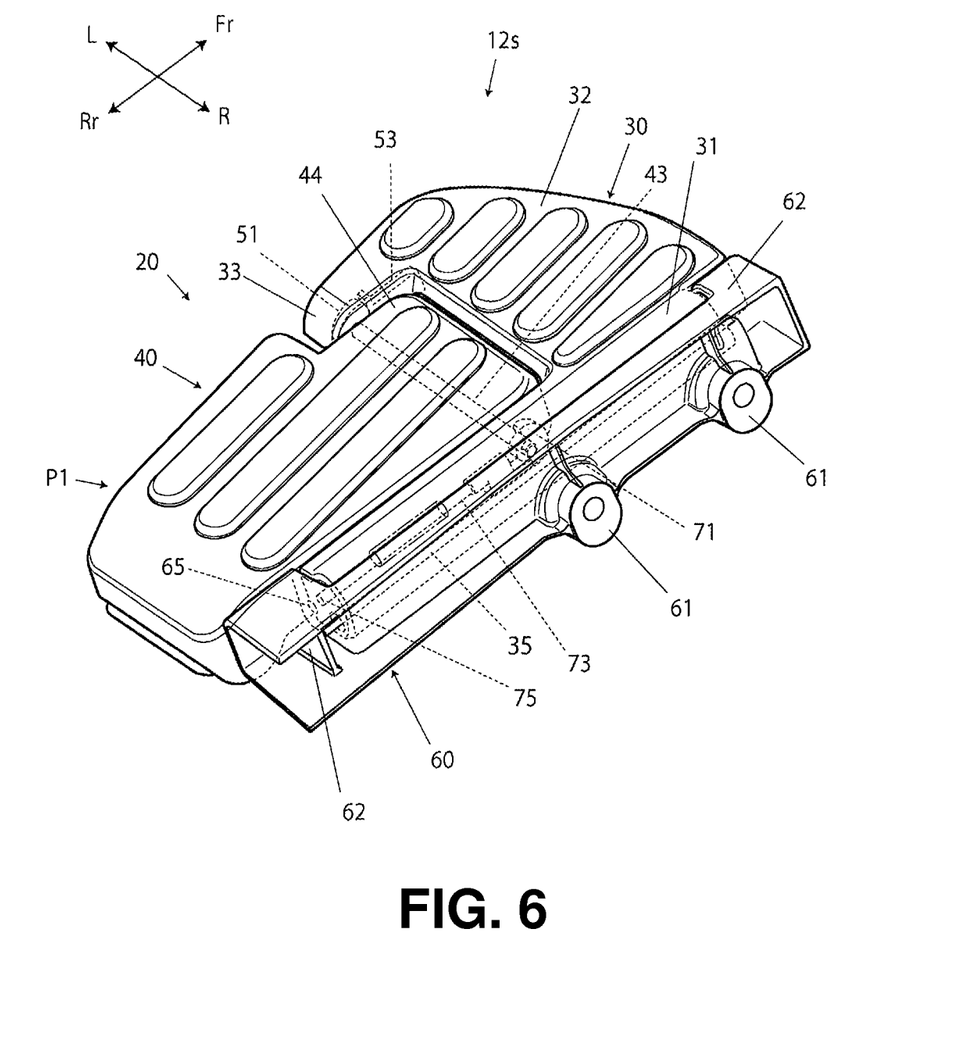
FIG. 6 is a rear side perspective view of the step structure similar to FIG. 4, but which includes an attaching structure that is omitted in FIG. 4.

In FIG. 2, FIG. 3, and FIG. 6, a reference numeral 60 denotes an attaching member for attaching the base portion 30 to the vehicle body 10. Fixing portions 61 (FIG. 6) of the attaching member 60 are fixed to the vehicle body 10 by bolts (not shown).

The base portion 30 includes: a shaft cylindrical portion 31 extending in the forward-rearward direction of the vehicle; a footrest portion 32 extending integrally from a front portion of the shaft cylindrical portion 31 to the outside in a vehicle width direction; and a shaft receiving portion 33 extending rearward from an outer end of the footrest portion 32 to rotatably support one end of the above-described shaft 43.

The shaft 43 is rotatably supported by the shaft receiving portion 33 and the shaft cylindrical portion 31 so as to be laid laterally between the shaft receiving portion 33 and the shaft cylindrical portion 31. The shaft 43 rotatably supports a front portion 44 of the movable portion 40 such that the front portion 44 of the movable portion 40 is rotatable relative to the base portion 30. The front portion 44 of the movable portion 40 is loosely (rotatably) inserted between the shaft cylindrical portion 31 and the shaft receiving portion 33 of the base portion 30.

A shaft 35 extending in the vehicle forward-rearward direction is inserted into the inside of the shaft cylindrical portion 31. Both ends of the shaft 35 are each supported by a shaft receiving portion 62 in the attaching member 60. Thus, the base portion 30 can rotate about the shaft 35 such that the base portion moves together with the movable portion 40, as indicated by the arrow A in FIG. 2. Incidentally, rotation of the base portion 30 in an opposite direction from the arrow A is regulated by a stopper (not shown in the figures) which is provided between the base portion 30 and the attaching member 60.

A lock mechanism 70 (see FIG. 7) for preventing the base portion 30 from being folded toward the vehicle body 10 in a state in which the movable portion 40 is at the second position P2 (see FIG. 3) is provided between the base portion 30 or the movable portion 40 and the vehicle body (the attaching member 60 in the present embodiment). Such a constitution permits the entire step structure to be folded closely adjacent the vehicle body and can eliminate a fear of the vehicle body 10 being scratched due to the folding of the base portion 30 toward the vehicle body in a state in which the movable portion 40 is at the second position P2.

Figure 7:
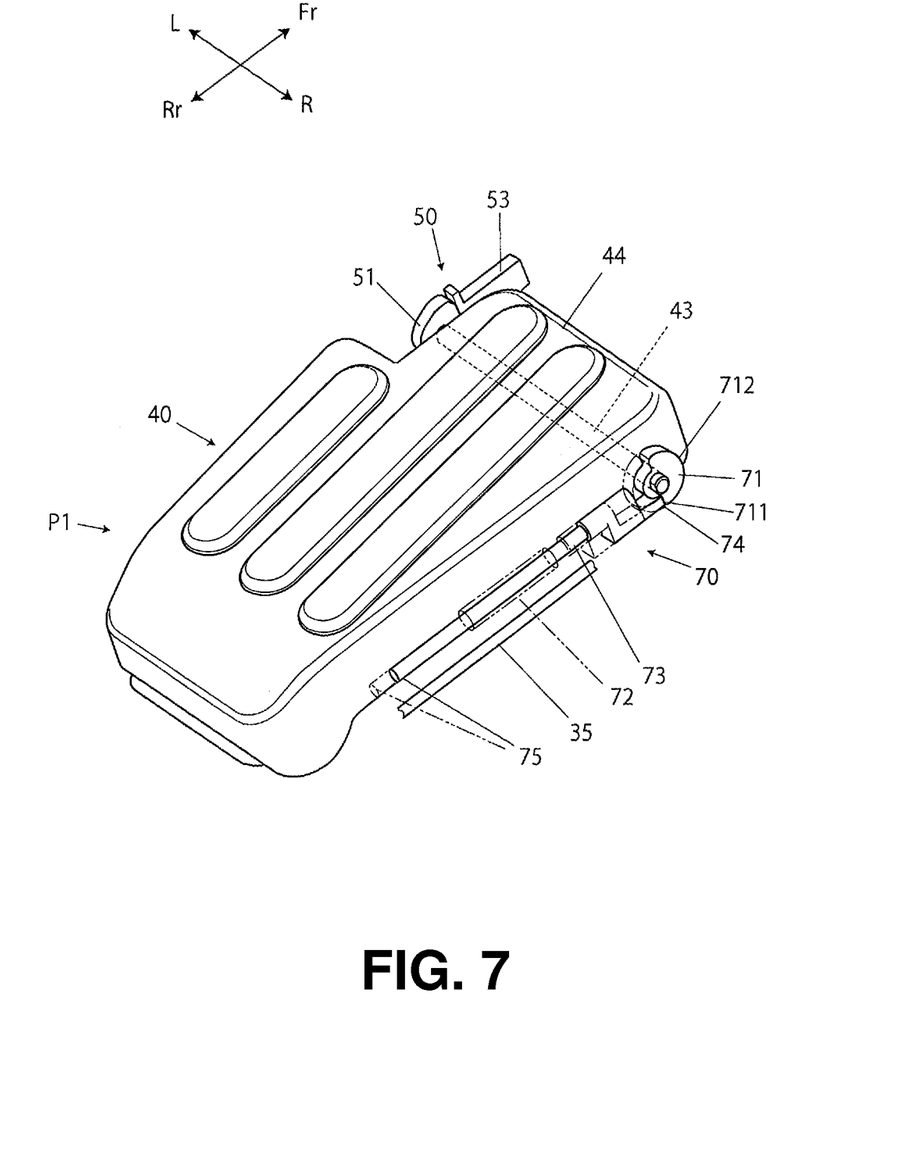
FIG. 7 is a rear side perspective view of a portion of the step structure of FIG. 2 mainly showing a lock mechanism of the step structure.

As shown in FIG. 7, the lock mechanism 70 includes: a lock mechanism cam 71 fixed to an end portion of the shaft 43 of the movable portion 40; and a locking rod 73 as a cam follower that abuts against the lock mechanism cam 71 in a state of being biased by a spring 72. As also shown in FIG. 4, the locking rod 73 is supported within the shaft cylindrical portion 31 of the base portion 30 so as to be slidable in the axial direction of the locking rod 73, and is biased to the lock mechanism cam 71 by the spring 72.

The lock mechanism cam 71 includes: a receiving face 711 that receives the locking rod 73 by abutting against a front end 74 of the locking rod 73 when the movable portion 40 is at the first position P1 shown in FIG. 2, FIG. 4, and FIG. 7; and a lift face 712 that slides the locking rod 73 to the rear (Rr) against the biasing force of the spring 72 by rotating together with the movable portion 40 (hence the shaft 43) when the movable portion 40 rotates to the second position P2 shown in FIG. 3.

Meanwhile, as shown in FIG. 3, a locking hole 65 that a rear end 75 of the locking rod 73 can be engaged with and disengaged from is provided in a part of the attaching member 60 which part faces the locking rod 73 in the axial direction of the locking rod 73.

The lock mechanism 70 operates as follows. When the movable portion 40 is at the first position P1 shown in FIG. 2, FIG. 4, and FIG. 7, the receiving face 711 of the lock mechanism cam 71 abuts against the front end 74 of the locking rod 73 and thereby receives the locking rod 73. In this state, the rear end 75 of the locking rod 73 is disengaged (detached) from the locking hole 65 of the attaching member 60. Therefore, as indicated by the arrow A in FIG. 2, the base portion 30 can be folded to the side of the vehicle body 10 together with the movable portion 40.

When the movable portion 40 is at the second position P2 as shown in FIG. 3, on the other hand, as indicated by a phantom line in FIG. 7, the lift face 712 abuts against the front end 74 of the locking rod 73 and pushes the locking rod 73 so that it slides to the rear (Rr). In this state, as shown in FIG. 3, the rear end 75 of the locking rod 73 projects from the shaft cylindrical portion 31 to the rear, and is in a state of being inserted in the locking hole 65 of the attaching member 60. Hence, in the state in which the movable portion 40 is at the second position P2 as shown in FIG. 3, even if an attempt is made to rotate (fold) the base portion 30 and the movable portion 40 to the side of the vehicle body 10 as indicated by the arrow A with the movable portion 40 remaining in that state, the rotating operation is prevented by the engagement of the rear end 75 of the locking rod 73 and the locking hole 65 of the attaching member 60 with each other. Incidentally, the lock mechanism can also be provided between the movable portion 40 and the vehicle body 10.

As shown in FIG. 4 and FIG. 7, in the step structure 20 for the saddle riding type vehicle, the toggle mechanism cam 51 forming the toggle mechanism 50 is provided to one end portion of the shaft 43, and the lock mechanism cam 71 forming the lock mechanism 70 is provided to the other end portion of the shaft 43. With such a constitution, the toggle mechanism 50 and the lock mechanism 70 can be formed by making efficient, effective use of both ends of the shaft 43 for configuring the movable portion 40 to be rotatable relative to the base portion 30.

An exemplary embodiment of the present invention has been described above. However, the present invention is not limited to the foregoing embodiment, but can be modified as appropriate within the scope of the spirit of the present invention, as will be understood by persons of ordinary skill in the art.

DESCRIPTION OF REFERENCE SYMBOLS

1: Motorcycle (saddle riding type vehicle), 10: Vehicle body, 20: Step structure, 21: First footrest, 30: Base portion, P1: First position, P2: Second position, 22: Second footrest, 40: Movable portion, 43: Shaft, 50: Toggle mechanism, 51: Toggle mechanism cam, 70: Lock mechanism, 71: Lock mechanism cam

The invention claimed is:

1. A step structure for a saddle riding vehicle, comprising:
a base portion configured to be connected to a vehicle body, the base portion forming at least part of a first footrest; and
a movable portion rotatably coupled to the base portion so that the movable portion is movable between a first operative position thereof and a second operative position thereof by being rotated relative to the base portion,
wherein the movable portion forms a second footrest disposed at a position different from the first footrest when the movable portion is at the second operative position thereof, and
the movable portion includes different surfaces which respectively form at least part of the first footrest and the second footrest;
wherein the base portion is foldable toward and away from the vehicle body jointly together with the movable portion, and the step structure further includes a lock mechanism provided either between the base portion and the vehicle body or between the movable portion and the vehicle body, and which prevents the base portion from being folded toward the vehicle body when the movable portion is disposed in the second operative position thereof.

2. The step structure for the saddle riding vehicle according to claim 1, wherein the different surfaces of the movable portion which respectively form at least part of the first footrest and the second footrest are disposed on different sides of the movable portion.

3. The step structure for the saddle riding vehicle according to claim 2, wherein one of the different surfaces of the movable portion forms a surface of the first footrest configured to be engaged by an occupant and the other surface of the different surfaces of the movable portion forms a surface of the second footrest configured to be engaged by the occupant.

4. The step structure for the saddle riding vehicle according to claim 3, wherein the movable portion is rotatably coupled to the base portion by a shaft, and the step structure further includes a toggle mechanism provided between the shaft and the base portion, and which provides a secure click fit for the movable portion at each of the first and second operative positions thereof.

5. The step structure for the saddle riding vehicle according to claim 2, wherein the movable portion is rotatably coupled to the base portion by a shaft, and the step structure further includes a toggle mechanism provided between the shaft and the base portion, and which provides a secure click fit for the movable portion at each of the first and second operative positions thereof.

6. The step structure for the saddle riding vehicle according to claim 1, wherein the movable portion is rotatably coupled to the base portion by a shaft, and the step structure further includes a toggle mechanism provided between the shaft and the base portion, and which provides a secure click fit for the movable portion at each of the first and second operative positions thereof.

7. The step structure for the saddle riding vehicle according to claim 6, wherein the toggle mechanism includes a toggle mechanism cam provided to one end portion of the shaft, and the lock mechanism includes a lock mechanism cam provided to another end portion of the shaft.

8. A saddle riding vehicle, comprising a vehicle body; and a pair of step structures respectively connected to the vehicle body on fight and left sides thereof; wherein each of the step structures includes:

a base portion connected to the vehicle body, the base portion forming at least part of a first footrest; and a movable portion rotatably coupled to the base portion so that the movable portion is movable between a first operative position thereof and a second operative position thereof by being rotated relative to the base portion, wherein the movable portion forms a second footrest disposed at a position different from the first footrest when the movable portion is at the second operative position thereof, and the movable portion includes different surfaces which respectively form at least part of the first footrest and the second footrest;

wherein the base portion is foldable toward and away from the vehicle body jointly together with the movable portion, and the step structure further includes a lock mechanism provided either between the base portion and the vehicle body or between the movable portion and the vehicle body, and which prevents the base portion from being folded toward the vehicle body when the movable portion is disposed in the second operative position thereof.

9. The saddle riding type vehicle according to claim 8, wherein the different surfaces of the movable portion which respectively form at least part of the first footrest and the second footrest are disposed on different sides of the movable portion.

10. The saddle riding vehicle according to claim 9, wherein one of the different surfaces of the movable portion forms a surface of the first footrest configured to be engaged by an occupant and the other surface of the different surfaces of the movable portion forms a surface of the second footrest configured to be engaged by the occupant.

11. The saddle riding vehicle according to claim 10, wherein the movable portion is rotatably coupled to the base portion by a shaft, and the step structure further includes a toggle mechanism provided between the shaft and the base portion, and which provides a secure click fit for the movable portion at each of the first and second operative positions thereof.

12. The saddle riding vehicle according to claim 9, wherein the movable portion is rotatably coupled to the base portion by a shaft, and the step structure further includes a toggle mechanism provided between the shaft and the base portion, and which provides a secure click fit for the movable portion at each of the first and second operative positions thereof.

13. The saddle riding vehicle according to claim 8, wherein the movable portion is rotatably coupled to the base portion by a shaft, and the step structure further includes a toggle mechanism provided between the shaft and the base portion, and which provides a secure click fit for the movable portion at each of the first and second operative positions thereof.

14. The saddle riding vehicle according to claim 13, wherein the toggle mechanism includes a toggle mechanism cam provided to one end portion of the shaft, and the lock mechanism includes a lock mechanism cam provided to another end portion of the shaft.

\* \* \* \* \*